US008698768B2

(12) United States Patent
Lee et al.

(10) Patent No.: US 8,698,768 B2
(45) Date of Patent: Apr. 15, 2014

(54) TOUCH SCREEN PANEL AND DISPLAY DEVICE HAVING THE SAME

(75) Inventors: Jeong-Yeol Lee, Yongin (KR); Gyoo-Chul Jo, Yongin (KR); Jung-Ho Choi, Yongin (KR); Kwang-Min Kim, Yongin (KR); Seung-Yeon Cho, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 341 days.

(21) Appl. No.: 13/116,499

(22) Filed: May 26, 2011

(65) Prior Publication Data
US 2012/0105343 A1 May 3, 2012

(30) Foreign Application Priority Data

Oct. 28, 2010 (KR) ........................ 10-2010-0105791

(51) Int. Cl.
*G06F 3/041* (2006.01)
(52) U.S. Cl.
USPC ........................................................ 345/173
(58) Field of Classification Search
USPC ........................................................ 345/173
See application file for complete search history.

(56) References Cited

U.S. PATENT DOCUMENTS

| 6,137,427 A | 10/2000 | Binstead |
| 2010/0045614 A1 | 2/2010 | Gray et al. |
| 2010/0182256 A1* | 7/2010 | Jeong et al. .................... 345/173 |
| 2011/0227839 A1* | 9/2011 | Rho et al. ........................ 345/173 |
| 2011/0227840 A1* | 9/2011 | Sim et al. ........................ 345/173 |

FOREIGN PATENT DOCUMENTS

| CN | 101488066 A | 7/2009 |
| JP | 2008-310550 | 12/2008 |
| KR | 10-2009-0058072 | 6/2009 |
| KR | 10-0909265 | 7/2009 |

OTHER PUBLICATIONS

European Search Report issued on Dec. 18, 2013 in the European Patent Application No. 11181528.8 which claims priority of the corresponding Korean priority application No. 10-2010-0105791.

* cited by examiner

*Primary Examiner* — Aneeta Yodichkas
(74) *Attorney, Agent, or Firm* — Robert E. Bushnell, Esq.

(57) ABSTRACT

A touch screen panel comprises a first sensing pattern provided with first sensing cells arranged on one row along a first direction on a transparent substrate, and a first connection pattern through which adjacent first sensing cells are electrically connected to each other. A second sensing pattern is provided with second sensing cells arranged so as to be spaced apart from the first sensing cells on one column along a second direction on the transparent substrate, and a second connection pattern through which adjacent second sensing cells are electrically connected to each other. The first connection pattern includes at least two pairs of metal patterns arranged so as to be spaced apart from one another, and a transparent pattern formed in the shape of an island in the second sensing pattern so as to be electrically connected to one or the other end of each of the metal patterns.

20 Claims, 8 Drawing Sheets

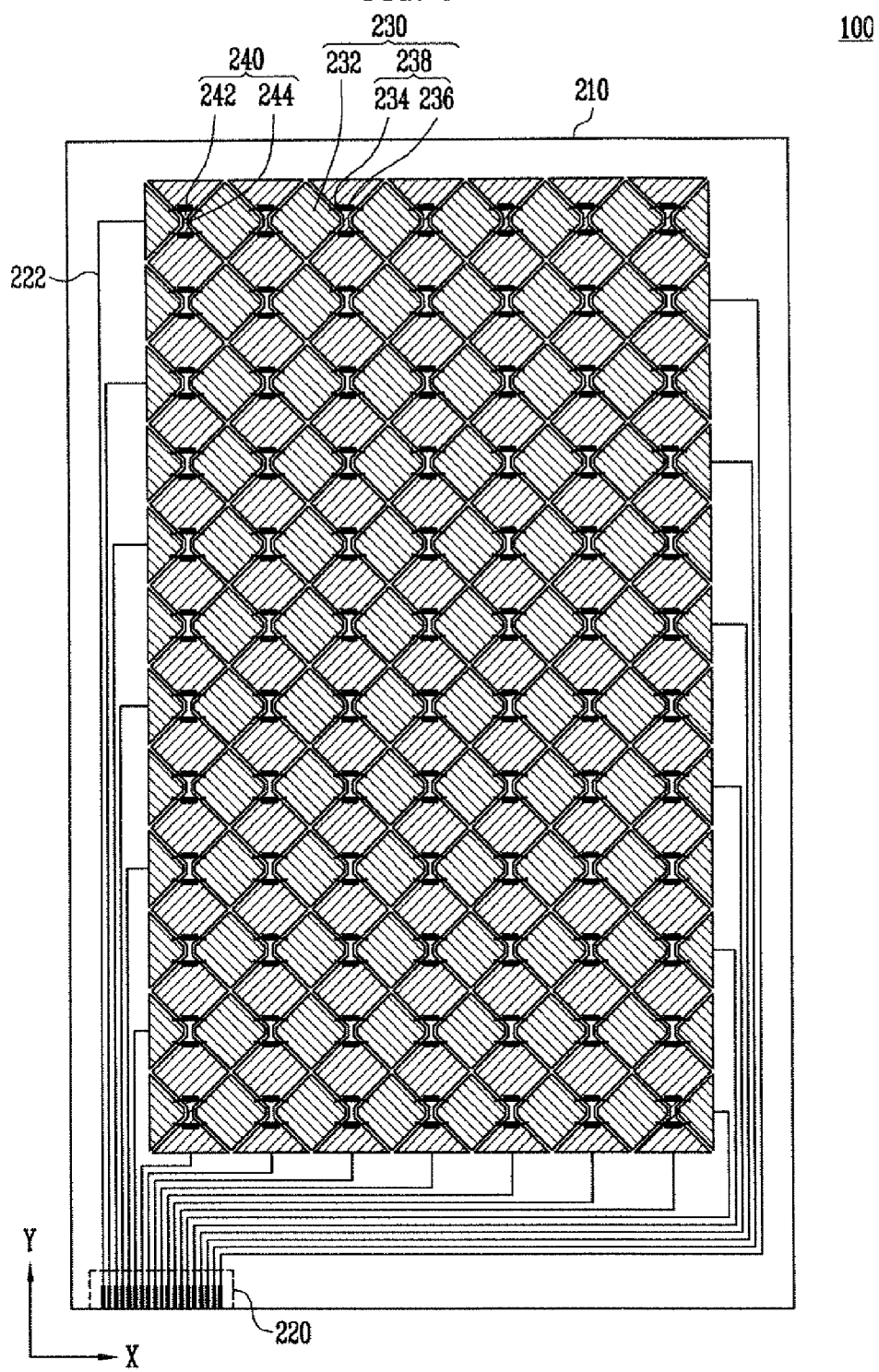

TOUCH SCREEN PANEL AND DISPLAY DEVICE HAVING THE SAME

CLAIM OF PRIORITY

This application makes reference to, incorporates the same herein, and claims all benefits accruing under 35 U.S.C. §119 from an application earlier filed in the Korean Intellectual Property Office on the 28 Oct. 2010 and there duly assigned Serial No. 10-2010-0105791.

BACKGROUND OF THE INVENTION

1. Field of the Invention

The present invention relates to a touch screen panel and a display device having the same, and more particularly, to a touch screen panel and a display device having the same, the panel and the device being capable of enhancing visibility and preventing a failure caused by static electricity.

2. Description of the Related Art

As demands on various types of display devices have recently increased with the development of an information society, studies on display devices, such as a liquid crystal display device (LCD), a plasma display panel (PDP), a field emission display device (FED), an electrophoretic display device (EPD) and an organic light emitting display device (OLED), have been actively conducted.

Recently, studies have been conducted to apply a touch screen panel function to such display devices. A touch screen panel is an input device which enables a command to be inputted by touching a screen of a display device using an object, such as a finger or pen. Since such a touch screen panel can be substituted for a separate input device connected to a display device, such as a keyboard or mouse, its application fields have been gradually extended.

Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in the capacitance formed between a conductive sensing pattern and an adjacent sensing pattern, ground electrode or the like when an object, such as a user's hand or pen, comes in contact with the touch screen panel.

The sensing patterns include first sensing patterns formed so as to be connected along a first direction, second sensing patterns formed so as to be connected along a second direction, and connection patterns which connect the first and second sensing patterns, respectively. The first and second sensing patterns are respectively disposed in different layers with an insulating layer interposed therebetween.

When sensing patterns are respectively formed in different layers as described above, the surface resistance of a transparent conductive material used to form the sensing patterns is large. Therefore, in order to decrease the surface resistance, there has been proposed a method in which the width of a connection portion for connecting the sensing patterns positioned in the same layer is implemented so as to be wide. However, the overlapping area of the connection portions respectively positioned in the upper and lower layers is increased, and the capacitance for the overlapping area is also increased. Therefore, the sensitivity of each of the sensing patterns is lowered.

In order to solve such a problem, there has recently been proposed a method of connecting the first and second sensing patterns through connection patterns made of a metallic material. However, the connection patterns made of the metallic material decrease the area of pixels, and therefore, the visibility of the display device is deteriorated. Moreover, since the connection patterns made of the metallic material are weak relative to static electricity at portions overlapping the transparent conductive material, disconnection frequently occurs, and therefore, a failure of the touch screen panel is caused.

SUMMARY OF THE INVENTION

The present invention provides a touch screen panel and a display device having the same, the panel and the device being capable of enhancing visibility and preventing a failure caused by static electricity.

According to an aspect of the present invention, a touch screen panel comprises: a first sensing pattern provided with a plurality of first sensing cells arranged on one row along a first direction on a transparent substrate, and a first connection pattern through which adjacent first sensing cells are electrically connected to each other; and a second sensing pattern provided with a plurality of second sensing cells arranged so as to be spaced apart from the first sensing cells on one column along a second direction on the transparent substrate, and a second connection pattern through which adjacent second sensing cells are electrically connected to each other.

In the touch screen panel, the first connection pattern includes at least two pairs of metal patterns arranged so as to be spaced apart from one another, and a transparent pattern formed in the shape of an island in the second sensing pattern so as to be electrically connected to one end or the other end of each of the metal patterns.

According to an aspect of the present invention, a display device having a touch screen panel comprises: a display panel which displays an image; a first sensing pattern provided with a plurality of first sensing cells arranged on one row along a first direction on the display panel, and a first connection pattern through which adjacent first sensing cells are electrically connected to each other; and a second sensing pattern provided with a plurality of second sensing cells arranged so as to be spaced apart from the first sensing cells on one column along a second direction on the display panel, and a second connection pattern through which adjacent second sensing cells are electrically connected to each other.

In the display device, the first connection pattern includes at least two pairs of metal patterns arranged so as to be spaced apart from one another, and a transparent pattern formed in the shape of an island in the second sensing pattern so as to be electrically connected to one end or the other end of each of the metal patterns.

The transparent pattern may be formed of the same material in the same layer as the second sensing pattern while being spaced apart from the second sensing pattern. The transparent pattern may be formed of indium tin oxide (ITO) or indium zinc oxide (IZO). The transparent pattern may be formed of the same material in the same layer as the first sensing pattern while being spaced apart from the first sensing pattern.

The transparent pattern may be provided with a pair of transparent patterns arranged so as to be spaced apart from each other in the adjacent second sensing cells, and each of the pair of transparent patterns may be disposed so as to be spaced apart from the second sensing cell. The transparent pattern may be formed so as to be extended from the second sensing cell to the second connection pattern and the adjacent second sensing cells.

The metal pattern may be disposed diagonally with respect to the first direction. The metal pattern may be made of a metallic material, and disposed so as to overlap the second sensing cell with an insulating layer interposed therebetween.

The metal pattern may be formed of a low-resistance metallic material such as molybdenum (Mo), silver (Ag), titanium (Ti), copper (Cu), aluminum (Al) or molybdenum/aluminum/molybdenum (Mo/Al/Mo).

The first connection pattern may be provided with the metal patterns at both edges of the transparent pattern with respect to the transparent pattern so that the adjacent first sensing cells are electrically connected to each other.

As described above, according to embodiments of the present invention, adjacent first sensing cells are connected to each other through at least two pairs of metal patterns so that it is possible to prevent a vulnerability to static electricity and failure caused by the static electricity.

Also, in addition to the at least two pairs of metal patterns, an island-shaped transparent pattern is disposed as a connection pattern for connecting the first sensing cells to each other between second sensing cells or second connection patterns so that the visibility of the display panel can be improved by minimizing the area of a metallic material corresponding to the light emitting area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 5 is a plan view showing a touch screen panel according to a second embodiment of the present invention.

DETAILED DESCRIPTION OF THE INVENTION

Figure 1:
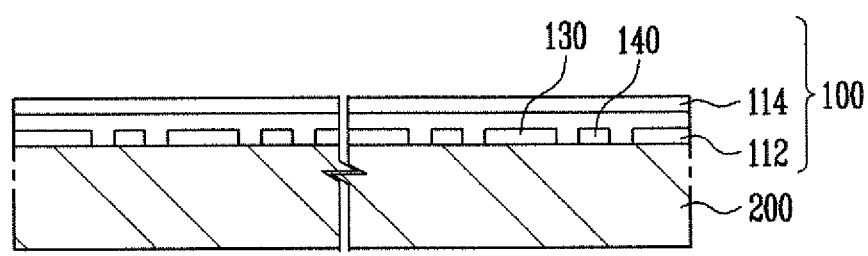
FIG. 1 is a sectional view of a display device having a touch screen panel according to an embodiment of the present invention.

In the following detailed description, only certain exemplary embodiments of the present invention are shown and described, simply by way of illustration. As those skilled in the art will realize, the described embodiments maybe modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter a touch screen panel and a display device having the same according to embodiments of the present invention will be described in detail with reference to the accompanying drawings: i) shapes, sizes, rates, angles, numbers and the like, shown in the accompanying drawings, are provided only for illustrative purposes, and may be modified to some extent; ii) since the drawings are viewed with observer's eyes, directions or positions described in the drawings may be variously modified depending on observer's positions; iii) like reference numerals may be used to indicate like parts throughout the drawings; iv) when the terms 'comprise', 'have', 'include' and the like are used, other parts may be added as long as the term 'only' is not used; v) the singular forms may be interpreted as the plural forms; vi) although the terms 'about', 'substantially' and the like are not used, shapes, comparisons between sizes, relations between positions, and the like are interpreted to include an ordinary error range; vii) although the terms 'after', 'before', 'subsequently', 'also', 'here', 'at this time' and the like are used, they are not used to limit temporal positions; viii) the terms 'first', 'second', 'third' and the like are selectively, mutually or repeatedly used for distinguishing between similar elements and not used as confined meanings; ix) when the positional relationship between two parts is described using the terms 'on', 'above', 'below', 'next' and the like, one or more parts may be positioned between the two parts as long as the term 'immediately' is not used; and x) when parts are linked by the term 'or', they are interpreted individually or in combination, but when they are linked by the term 'or one of', they are only interpreted individually.

FIG. 1 is a sectional view of a display device having a touch screen panel according to an embodiment of the present invention.

Referring to FIG. 1, a display device having a touch screen panel includes a touch screen panel 100 to which a command is inputted at a contact position and a display panel 200 for displaying an image based on the command inputted to the touch screen panel 100.

Figure 2:
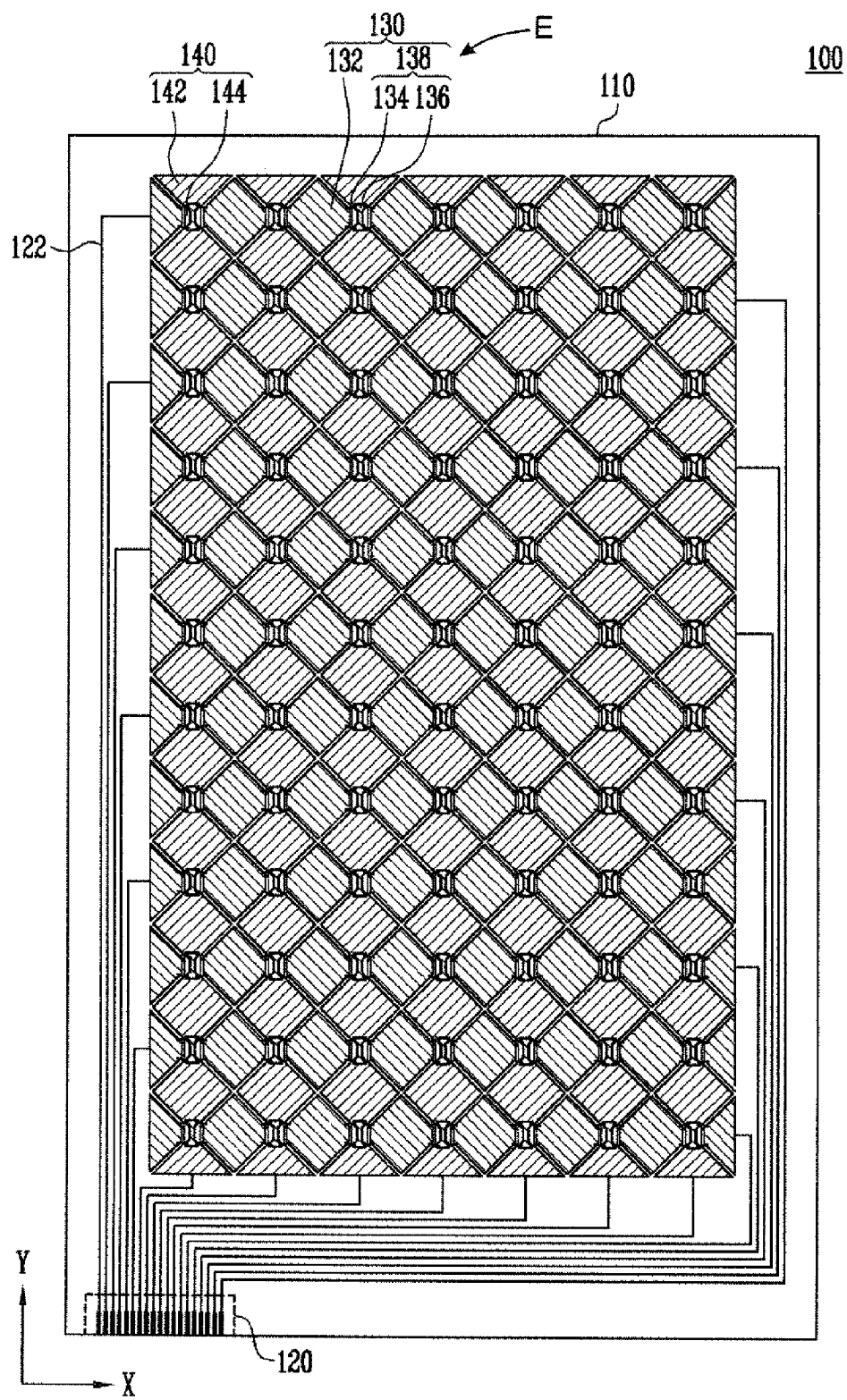
FIG. 2 is a plan view showing a touch screen panel according to a first embodiment of the present invention.
Figure 3:
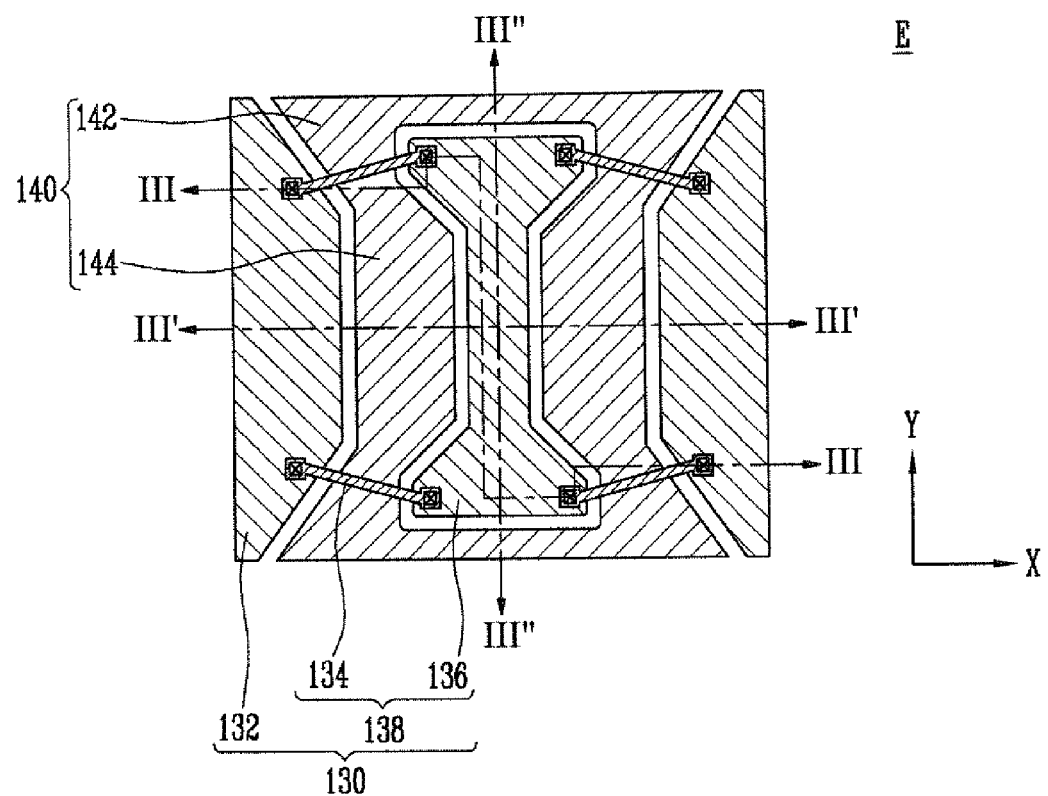
FIG. 3 is a main part enlarged view showing an embodiment of sensing cells and connection patterns at portion E shown in FIG. 2.

FIG. 2 is a plan view showing a touch screen panel according to a first embodiment of the present invention; and FIG. 3 is a main part enlarged view showing an embodiment of sensing cells and connection patterns at portion E shown in FIG. 2.

Referring to FIGS. 2 and 3, a touch screen panel 100 according to a first embodiment of the present invention includes a transparent substrate 110, sensing patterns 130 and 140 formed in an active area on the transparent substrate 110, and position detecting lines 122 formed in a non-active area outside the active area.

The transparent substrate 110 may be an upper substrate which constitutes the display panel 200 of FIG. 1 in the display device. Alternatively, the transparent substrate 110 may be a separate substrate attached to the display panel 200.

The sensing patterns 130 and 140 are alternately arranged, and include first sensing patterns 130 formed so as to be connected to one another for each row having the same X coordinate, and second sensing patterns 140 formed so as to be connected to one another for each column having the same Y coordinate. In this instance, the touch screen panel 100 is implemented as a capacitive touch screen panel in which the first sensing patterns 130 and the second sensing patterns 140 are alternately distributed and arranged in the active area.

The first sensing patterns 130 include first sensing cells 132 which are arranged along a first direction (column direction) for each column having the same X coordinate in the active area, and a first connection pattern 138 which connects the first sensing cells 132 to each other.

The first sensing cells 132 are made of a transparent conductive material having a predetermined transmittance or higher so that light from the display panel 200 (disposed beneath the touch screen panel 100 of FIG. 1) can be transmitted for the purpose of implementing the operation of the touch screen panel 100. Indium tin oxide (ITO) or indium zinc oxide (IZO) may be used as the transparent conductive material.

In order to serve as sensing electrodes of the touch screen panel 100, the first sensing cells 132 of FIG. 2 arranged along the first direction are necessarily electrically connected to each other. Accordingly, the first sensing cells 132 are electrically connected to each other by the first connection pattern 138.

The first connection pattern 138 electrically connects the first sensing cells 132 along the first direction. To this end, the first connection pattern 138 includes at least two pairs of metal patterns 134 and a transparent pattern 136 through which the at least two pairs of metal patterns 134 are electrically connected to one another.

The at least two pairs of metal patterns 134 are arranged so as to respectively overlap edges of the second sensing pattern 140 while being spaced apart from one another. In this instance, the metal patterns 134 are designed so as to be inclined at a predetermined angle with respect to an X-direction. The metal patterns 134 are less visualized based on the person's visual characteristics so that the recognition degree for a diagonal direction is lower than that for a horizontal or vertical direction, and thus, visibility is improved.

In this embodiment, the first connection pattern 138 which connects the first sensing cells 132 to each other is implemented as the at least two pairs of metal patterns 134 arranged so as to be spaced apart from one another so that, although one metal pattern is disconnected due to static electricity, an electrical signal can be supplied to another metal pattern, thereby ensuring the stability of the first connection pattern 138. As such, in this embodiment, the problem of electrostatic discharge (ESD) can be solved by overcoming any vulnerability to static electricity.

The metal patterns 134 are formed of a low-resistance metallic material. The metallic material used for the metal patterns 134 may include a low-resistance metallic material such as molybdenum (Mo), silver (Ag), titanium (Ti), copper (Cu), aluminum (Al) or molybdenum/aluminum/molybdenum (Mo/Al/Mo).

The metal patterns 134 may be formed of the same material as the metallic material used for the position detecting lines 122 formed in the non-active area of the touch screen panel 100. In this case, since the metal patterns 134 are formed in the same layer through the same process as the position detecting lines 122, it is unnecessary to perform an additional mask process for forming the pair of metal patterns 134, so that it is possible to reduce the number of processes and time for manufacture.

Although the metal patterns 134 may be formed in the shape of a rectangular bar, as shown as shown in FIG. 3, this is merely one embodiment, and the present invention is not limited thereto.

The metal patterns 134, arranged so as to be spaced apart from one another, are electrically connected to both edges of the transparent pattern 136 so as to be electrically connected to one another. That is, one end of the metal pattern 134 is electrically connected to the first sensing cell 132, and the other end of the metal pattern 134 is electrically connected to the transparent pattern 136, so that adjacent first sensing cells 132, arranged to be spaced apart from each other, are nevertheless electrically connected to each other.

The transparent pattern 136 is disposed in the shape of an island spaced apart from the second sensing pattern 140 in the interior of the second sensing pattern 140. In this instance, the transparent pattern 136 may be formed so as to be extended between a second connection pattern 144 and adjacent second sensing cells 142.

The transparent pattern 136 is made of a transparent conductive material, and upper, lower, left and right corners of the transparent pattern 136 are respectively electrically connected to the metal patterns 134. ITO or IZO may be used as the transparent conductive material of the transparent pattern 136.

The transparent pattern 136 may be formed of the same material as the first sensing cells 132 and/or the second sensing pattern 140. In this case, since the transparent pattern 136 is formed in the same layer through the same process as the first sensing cells 132 and/or the second sensing pattern 140, it is unnecessary to perform an additional mask process for forming the pair of metal patterns 134, so that it is possible to reduce the number of processes and time for manufacture.

The transparent pattern 136 may be formed in the shape of an English alphabet 'I'. However, this is merely one embodiment and the present invention is not limited thereto.

As described above, the first sensing cells 132 are connected to each other by the at least two pairs of metal patterns 134 made of a low-resistance metallic material, so that the flow of charge can be activated at the connection portions between the first sensing cells 132, thereby increasing the sensitivity of the first sensing cells 132.

Furthermore, in this embodiment, the transparent pattern 136 electrically connected to one or the other end of each of the metal patterns 134 is provided together with the metal patterns 134 in the implementation of the first connection pattern 138, so that the visibility of the display can be improved by minimizing the area of the metallic material corresponding to the light emitting area.

The second sensing patterns 140 include second sensing cells 142 which are arranged so as to be spaced apart from the first sensing cells 132 along a second direction (column direction) for each row having the same X coordinate in the active area, and a second connection pattern 144 which connects the second sensing cells 142 to each other.

The second sensing cells 142 are made of a transparent conductive material having a predetermined transmittance or higher so that light from the display panel 200 (disposed beneath the touch screen panel 100 in FIG. 1) can be transmitted for the purpose of implementing the operation of the touch screen panel 100. ITO or IZO may be used as the transparent conductive material. The second sensing cells 142 may be formed of the same material in the same layer as the first sensing cells 132.

In order to serve as sensing electrodes of the touch screen panel 100, the second sensing cells 142, arranged along the second direction, are necessarily electrically connected to each other. Accordingly, the second sensing cells 142 are electrically connected to each other by the second connection pattern 144.

The second connection pattern 144 electrically connects the second sensing cells 142 to each other along the second direction. The second connection pattern 144 is made of a transparent conductive material so as to improve the visibility of the touch screen panel 100. ITO or IZO may be used as the transparent conductive material. In this instance, the second connection pattern 144 may be integrally formed with the second sensing cell 142.

In order to prevent a short circuit between the second and first connection patterns 144 and 138, respectively, the second connection pattern 144 formed in the same layer as the transparent pattern 136 is disposed so as to be diverged from the second sensing cell 142 to both sides of the transparent pattern 136 with the transparent pattern 136 interposed therebetween. In this instance, the diverged second connection pattern 144 is disposed so as to be spaced apart from the transparent pattern 136 in the same layer.

Figure 4A:
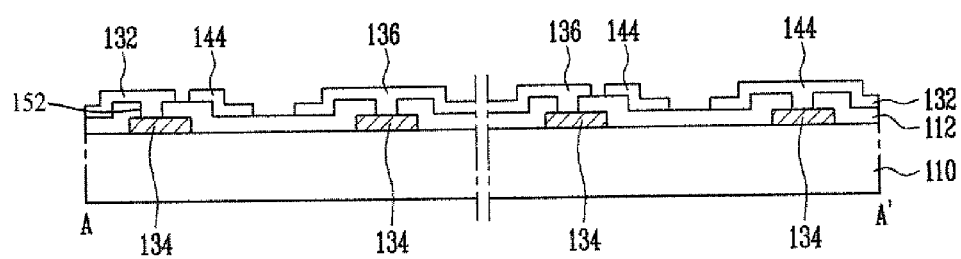
FIGS. 4A to 4C are main part sectional views of the sensing cells and connection patterns of the touch screen panel taken along lines III-III, III'-III' and III"-III" of FIG. 3, respectively.
Figure 4B:
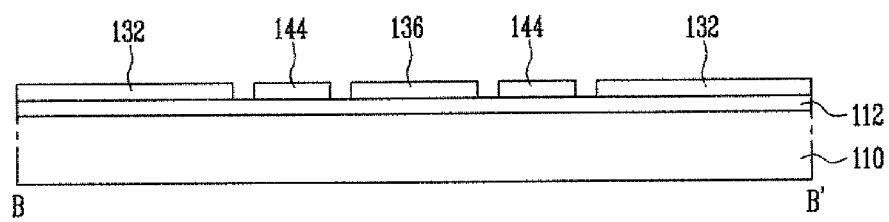
Figure 4C:
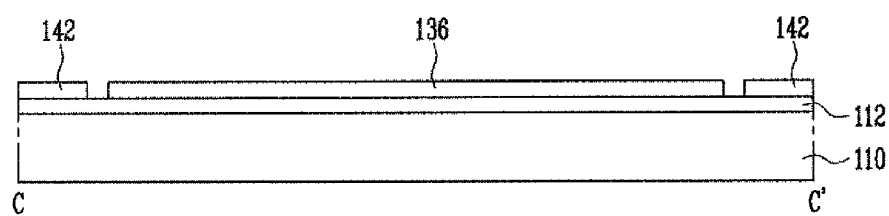

FIGS. 4A to 4C are main part sectional views of the sensing cells and connection patterns of the touch screen panel taken along lines III'-III' and III"-III" of FIG. 3, respectively.

The at least two pairs of metal patterns 134 may be formed in the same layer so as to prevent a short circuit between the metal patterns 134 and the second sensing pattern 140.

That is, referring to FIGS. 4A to 4C, at least two pairs of metal patterns 134 are formed on the transparent substrate 110, and an insulating layer 112 is formed on the transparent substrate 110 including the at least two pairs of metal patterns 134.

Contact holes 152 for respectively exposing both edges of each of the at least two pairs of metal patterns 134 are formed in regions of the insulating layer 112, respectively corresponding to both edges of each of the at least two pairs of metal patterns 134. The first sensing cells 132 are formed on one end of the metal patterns 134 exposed through the contact holes 152 so that the first sensing cells 132 and the metal patterns 134 are electrically connected to each other.

The transparent pattern 136 is formed on the other end of the metal patterns 134 exposed through the contact holes 152 so that the metal patterns 134 and the transparent pattern 136 are electrically connected to each other. Thus, adjacent first sensing cells 132 are electrically connected to each other through the metal patterns 134 and the transparent pattern 136.

Meanwhile, one or more contact holes 152, particularly, two or more contact holes 152, are formed in the connection between one end or the other end of the metal pattern 134 and the first sensing cell 132 or transparent pattern 136, so that contact resistance can be decreased. Therefore, the number of contact holes 152 may be controlled in consideration of contact resistance, visibility, and the like.

The second connection pattern 144 is formed so as to overlap the metal patterns 134, with the insulating layer 112 interposed therebetween, so as to be electrically connected to the second sensing cells 142. The second connection pattern 144 may be integrally formed with the second sensing cell 142. The second connection pattern 144 is formed in the same layer as the transparent pattern 136, but the second connection pattern 144 and the transparent pattern 136 are formed so as to be spaced apart from each other as described above.

Referring back to FIG. 2, the position detecting lines 122 are arranged in the non-active area of the touch screen panel 100, which is formed outside the active area for displaying an image, so as to supply a signal sensed by the sensing patterns 130 and 140 to an external driving circuit (not shown) through a pad portion 120.

In this instance, the first sensing patterns 130, connected to one another along the first direction for each column, are electrically connected to the respective position detecting lines 122. The second sensing patterns 140, connected to one another along the second direction for each row, are electrically connected to the respective position detecting lines 122.

The position detecting line 122 may be formed of a low-resistance metallic material or transparent electrode material, such as Mo, Ag, Ti, Cu, Al or Mo/Al/Mo.

As described above, the touch screen panel 100 is a capacitive touch screen panel. If the touch screen panel 100 is contacted by a contact object, such as a user's finger or stylus pen, a change in capacitance, caused by a contact position, is provided to the external driving circuit (not shown) through the position detecting lines 122 and the pad portion 120 from the sensing patterns 130 and 140. Then, the change in capacitance is converted into an electrical signal by an X and Y input processing circuit (not shown) or the like, so that the contact position is detected.

Meanwhile, in this embodiment, the first and second sensing cells 132 and 142, respectively, are not necessarily positioned in the same layer. For example, the first and second sensing cells 132 and 142, respectively, may be alternatively disposed in different layers from each other. An undescribed protection layer 114 is formed on the sensing patterns 130 and 140 so as to protect the sensing patterns 130 and 140 formed therebelow. The insulating layer 112 and the protection layer 114 may be formed of a transparent insulating material such as silicon oxide ($SiO_2$).

Figure 6:
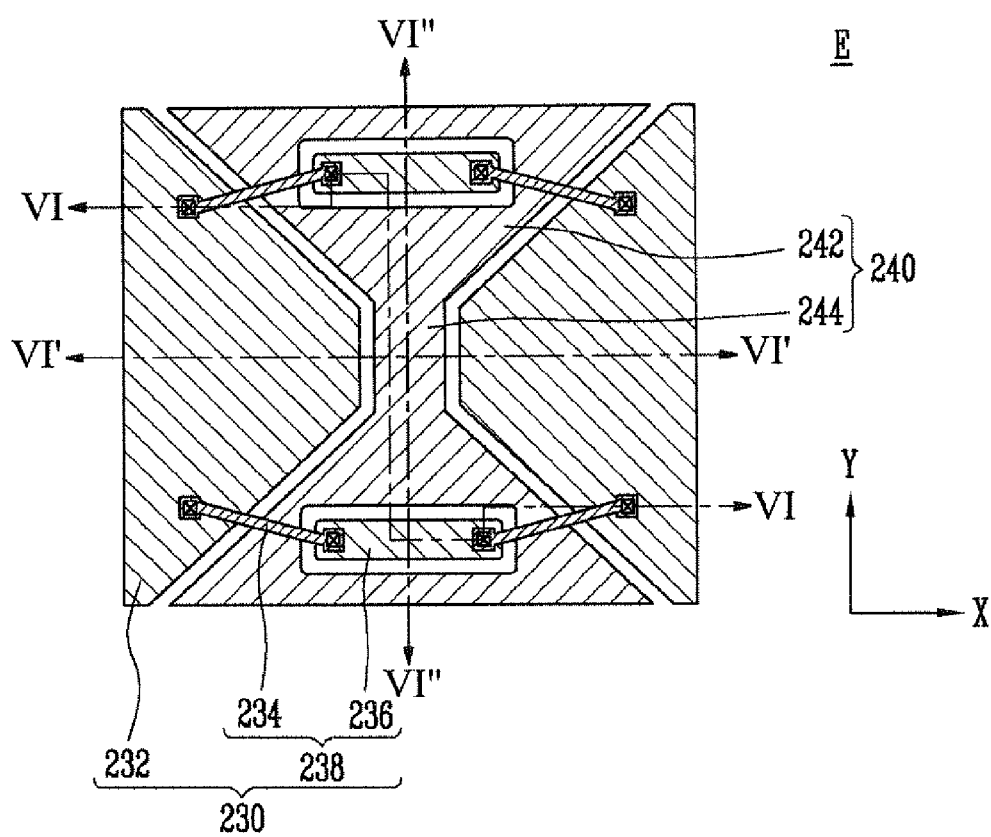
FIG. 6 is a main part enlarged view showing an embodiment of sensing cells and connection patterns at portion E shown in FIG. 5.

FIG. 5 is a plan view showing a touch screen panel according to a second embodiment of the present invention; and FIG. 6 is a main part enlarged view showing an embodiment of sensing cells and connection patterns at portion E shown in FIG. 5.

Referring to FIGS. 5 and 6, the touch screen panel 100 according to a second embodiment of the present invention includes a transparent substrate 210, sensing patterns 230 and 240 formed in an active area on the transparent substrate 210, and position detecting lines 222 formed in a non-active area at the outside of the active area. Since the position detecting lines 222 and a pad portion 220 are identical to those described in the first embodiment, their descriptions will be omitted.

The transparent substrate 210 may be an upper substrate which constitutes the display panel 200 in the display device. Alternatively, the transparent substrate 210 may be a separate substrate attached to the display panel 200.

The sensing patterns 230 and 240 are alternately arranged, and include first sensing patterns 230 formed so as to be connected to one another for each row having the same X coordinate, and second sensing patterns 240 formed so as to be connected to one another for each column having the same Y coordinate. In this instance, the touch screen panel 100 is implemented as a capacitive touch screen panel in which the first sensing patterns 230 and the second sensing patterns 240 are alternately distributed and arranged in the active area.

The first sensing patterns 230 include first sensing cells 232 which are arranged along a first direction (row direction) for each column having the same Y coordinate in the active area, and a first connection pattern 238 which connects the first sensing cells 232 to each other. Since the configuration and effect of the first sensing cells 232 are identical to those of the first sensing cells 132 in the first embodiment, their descriptions will be omitted.

In order to serve as sensing electrodes of the touch screen panel 100, the first sensing cells 232 arranged along the first direction are necessarily electrically connected to each other. Accordingly, the first sensing cells 232 are electrically connected to each other by the first connection pattern 238.

The first connection pattern 238 electrically connects the first sensing cells 232 along the first direction. To this end, the first connection pattern 238 includes at least two pairs of metal patterns 234 and transparent patterns 236 through which the at least two pairs of metal patterns 234 are electrically connected to one another.

The at least two pairs of metal patterns 234 are arranged so as to respectively overlap edges of the second sensing pattern 240 while being spaced apart from one another. In this instance, the metal patterns 234 are designed so as to be inclined at a predetermined angle with respect to an X-direction. The metal patterns 234 are less visualized based on the person's visual characteristics so that the recognition degree for a diagonal direction is lower than that for a horizontal or vertical direction, and thus, visibility is improved.

In this embodiment, the first connection pattern 238 which connects the first sensing cells 232 to each other is implemented as the at least two pairs of metal patterns 234 arranged so as to be spaced apart from one another so that, although one metal pattern is disconnected due to static electricity, an electrical signal can be supplied to another metal pattern, thereby ensuring the stability of the first connection pattern 238. As such, in this embodiment, the problem of ESD can be solved by overcoming any vulnerability to the static electricity.

The metal patterns 234 are formed of a low-resistance metallic material. The metallic material used for the metal patterns 234 may include a low-resistance metallic material such as Mo, Ag, Ti, Cu, Al or Mo/Al/Mo.

The metal patterns 234 may be formed of the same material as the metallic material used for the position detecting lines 222 formed in the non-active area of the touch screen panel 100. In this case, since the metal patterns 234 are formed in the same layer through the same process as the position detecting lines 222, it is unnecessary to perform an additional mask process for forming the pair of metal patterns 234, so that it is possible to reduce the number of processes and time for manufacture.

Although the metal patterns 234 may be formed in the shape of a rectangular bar, as shown in FIG. 6, this is merely one embodiment, and the present invention is not limited thereto.

The metal patterns 234, arranged so as to be spaced apart from one another, are electrically connected to one another by the transparent patterns 236. That is, one end of the metal pattern 234 is electrically connected to the first sensing cell 232, and the other end of the metal pattern 234 is electrically connected to each of the transparent patterns 236, so that adjacent first sensing cells 232, arranged so as to be spaced apart from each other, are electrically connected to each other.

The transparent patterns 236 are disposed in the shape of an island spaced apart from the second sensing pattern 240 (i.e., the second sensing cell 242 in the interior of the second sensing pattern 240). In this instance, the transparent patterns 236 are disposed in parallel so as to be spaced apart from each other, with the second connection pattern 244 interposed therebetween.

Each of the transparent patterns 236 is designed so as to correspond to a pair of metal patterns 234. However, the present invention is not limited thereto. That is, the number of transparent patterns 236 may be controlled in consideration of line resistance, visibility and the like, which are related to the number or area of metal patterns 234.

Since at least two pairs of metal patterns 234 are provided in this embodiment, at least two transparent patterns 236 may be designed so as to correspond to the at least two pairs of metal patterns, respectively. In this instance, one end or the other end of the metal pattern 234 is electrically connected to each of both edges of the transparent pattern 236.

In this embodiment, the transparent patterns 236 are disposed so as to be spaced apart from each other so that the area of the transparent pattern 236 can be minimized. As the area of the transparent pattern 236 is minimized, the line resistance can be decreased. The transparent patterns 236 are made of a transparent conductive material. ITO or IZO may be used as the transparent conductive material of the transparent patterns 236.

The transparent pattern 236 may be formed of the same material as the first sensing cells 232 and/or the second sensing pattern 240. In this case, since the transparent pattern 236 is formed in the same layer through the same process as the first sensing cells 232 and/or the second sensing pattern 240, it is unnecessary to perform an additional mask process for forming the pair of metal patterns 234, so that it is possible to reduce the number of processes and time for manufacture.

The transparent patterns 236 may be formed in the shape of a rectangular bar as described above. However, this is merely one embodiment and the present invention is not limited thereto.

As described above, the first sensing cells 232 are connected to each other by the metal patterns 234, made of a low-resistance metallic material, so that the flow of charge can be activated at the connection portions between the first sensing cells 232, thereby increasing the sensitivity of the first sensing cells 232.

Furthermore, in this embodiment, the transparent pattern 236 electrically connected to one or the other end of each of the metal patterns 234 is provided together with the metal patterns 234 in the implementation of the first connection pattern 238, so that the visibility of the display can be improved by minimizing the area of the metallic material corresponding to the light emitting area.

The second sensing patterns 240 include second sensing cells 242 which are arranged so as to be spaced apart from the first sensing cells 232 along a second direction (column direction) for each row having the same X coordinate in the active area, and a second connection pattern 244 which connects the second sensing cells 142 to each other.

The second sensing cells 242 are made of a transparent conductive material having a predetermined transmittance or higher so that light from the display panel 200 (disposed beneath the touch screen panel 100 in FIG. 1) can be transmitted for the purpose of implementing the operation of the touch screen panel 100. ITO or IZO may be used as the transparent conductive material.

In order to serve as sensing electrodes of the touch screen panel 100, the second sensing cells 242, arranged along the second direction, are necessarily electrically connected to each other. Accordingly, the second sensing cells 242 are electrically connected to each other by the second connection pattern 244.

The second connection pattern 244 electrically connects the second sensing cells 242 to each other along the second direction. The second connection pattern 244 is made of a transparent conductive material so as to improve the visibility of the touch screen panel 100. ITO or IZO may be used as the transparent conductive material. In this instance, the second connection pattern 244 may be integrally formed with the second sensing cell 242.

Figure 7A:
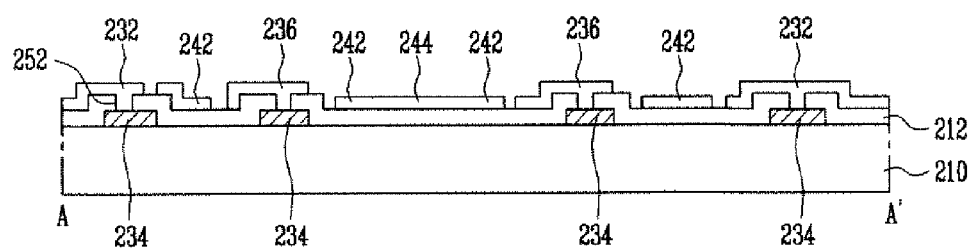
FIGS. 7A to 7C are main part sectional views of the sensing cells and connection patterns of the touch screen panel taken along lines VI-VI, VI'-VI' and VI"-VI" of FIG. 6, respectively.
Figure 7B:
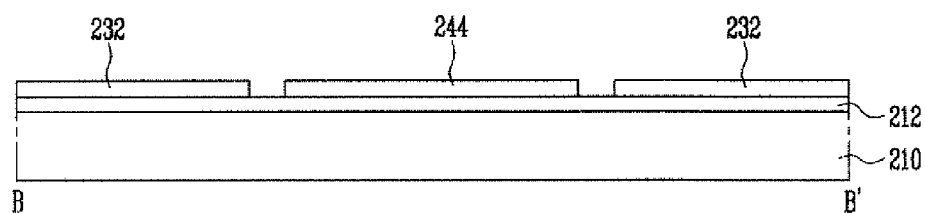
Figure 7C:
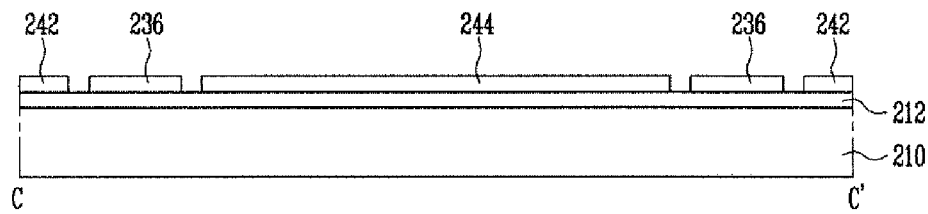

FIGS. 7A to 7C are main part sectional views of the sensing cells and connection patterns of the touch screen panel taken along lines VI-VI, VI'-VI' and VI"-VI" of FIG. 6, respectively.

The second sensing patterns 240 may be formed of the same material in the same layer as the first sensing cells 232 and/or the transparent pattern 236. In this instance, the second sensing cells 242 are disposed so as to be spaced apart from the transparent pattern 236 so as to prevent a short circuit between the second sensing cells 242 and the transparent pattern 236.

That is, referring to FIGS. 7A to 7C, at least two pairs of metal patterns 134 are formed on the transparent substrate 210, and an insulating layer 212 is formed on the transparent substrate 210 including the at least two pairs of metal patterns 234.

Contact holes 252 for respectively exposing both edges of each of the at least two pairs of metal patterns 234 are formed in regions of the insulating layer 212, respectively corresponding to both edges of each of the at least two pairs of metal patterns 234. The first sensing cells 232 are formed on one end of the metal patterns 234 exposed through the contact holes 252 so that the first sensing cells 232 and the metal patterns 234 are electrically connected to each other.

The transparent pattern 236 is formed on the other end of the metal patterns 234 exposed through the contact holes 252 so that the metal patterns 234 and the transparent pattern 236 are electrically connected to each other. Thus, adjacent first sensing cells 232 are electrically connected to each other through the metal patterns 234 and the transparent pattern 236.

The second connection pattern 244 is formed in the same layer as the first sensing cell 232, the transparent pattern 236 and the second sensing cell 242 on the insulating layer 212. However, the second connection pattern 244 is formed so as to be spaced apart from the sensing cell 232, and is integrally formed with the second sensing cell 242.

Figure 8:
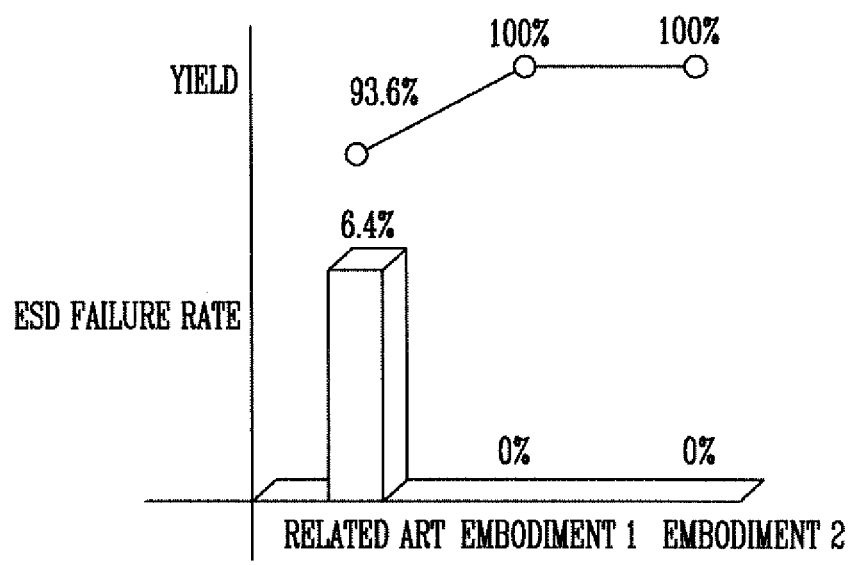
FIG. 8 is a graph comparing the failure rate of a touch screen panel according to the embodiments of the present invention with the failure rate of a touch screen panel according to the related art.

FIG. 8 is a graph comparing the failure rate of a touch screen panel according to the embodiments of the present invention with the failure rate of a touch screen panel according to the related art.

As shown in FIG. 8, while the failure rate caused by static electricity in a touch screen panel according to a related art is 6%, the failure rate caused by static electricity in the touch screen panel 100 according to the first and second embodiments corresponds to 0%. Thus, it can be seen that the failure caused by static electricity is completely removed. Also, it can be seen that, as the failure caused by static electricity is prevented, the yield is increased by 100%.

Although it has been described in these embodiments that the metal patterns 134 or 234 are formed in the lower layer of the first sensing cell 132 and 232, respectively, the transparent pattern 136 or 236, respectively, the second sensing cell 142 or 242, respectively, and the second connection pattern 144 or 244, respectively, the present invention is not necessarily limited thereto.

In one embodiment, the metal patterns 134 or 234 may be formed in the upper layer of the first sensing cell 132 and 232, respectively, the transparent pattern 136 or 236, respectively, the second sensing cell 142 or 242, respectively, and the second connection pattern 144 or 244, respectively. In this case, the configuration and effect in this embodiment are identical to those in the aforementioned embodiments, except that the order of the layers is changed, and therefore, their detailed descriptions will be omitted.

The touch screen panel 100 of the present invention may be formed on an independent substrate to be attached to a top surface of the display panel 200 or the like, or to be integrated with the display panel 200. That is, the plurality of first sensing patterns 130 or 230 and the plurality of second sensing patterns 140 or 240, which are arranged on a top of the display panel 200 so as to receive a touch input, are directly formed on the upper substrate of the display panel 200, so that touch screen panel 100 and the display panel 200 can be integrated with each other.

Meanwhile, it will be apparent that the display panel 200 may be implemented as various types of display panels for displaying images, such as a liquid crystal panel or organic light emitting display panel.

While the present invention has been described in connection with certain exemplary embodiments, it is to be understood that the invention is not limited to the disclosed embodiments but, on the contrary, is intended to cover various modifications and equivalent arrangements included within the spirit and scope of the appended claims, and equivalents thereof.

What is claimed is:

1. A touch screen panel, comprising:
   a first sensing pattern provided with a plurality of first sensing cells arranged on one row along a first direction on a transparent substrate, and a first connection pattern through which adjacent first sensing cells are electrically connected to each other; and
   a second sensing pattern provided with a plurality of second sensing cells arranged spaced-apart from the first sensing cells on one column along a second direction on the transparent substrate, and a second connection pattern through which adjacent second sensing cells are electrically connected to each other,
   the first connection pattern comprising at least two pairs of metal patterns arranged spaced-apart from one another, and a transparent pattern formed in a shape of an island in an interior of the second sensing pattern and electrically connected to an end of each of the metal patterns, the transparent pattern and the second sensing pattern configured to not overlap with each other in a direction perpendicular to a major surface of the transparent substrate.

2. The touch screen panel according to claim 1, wherein the transparent pattern is formed of a same material in a same layer as the second sensing pattern.

3. The touch screen panel according to claim 1, wherein the transparent pattern is formed of one of indium tin oxide (ITO) and indium zinc oxide (IZO).

4. The touch screen panel according to claim 1, wherein the transparent pattern is formed of a same material in a same layer as the first sensing pattern, and is spaced apart from the first sensing pattern.

5. The touch screen panel according to claim 1, wherein the transparent pattern is provided with a pair of transparent patterns arranged spaced-apart from each other in the adjacent second sensing cells, and wherein each of the pair of transparent patterns is disposed spaced-apart from a respective second sensing cell.

6. The touch screen panel according to claim 1, wherein the transparent pattern is extended from the second sensing cell to the second connection pattern and the adjacent second sensing cells.

7. The touch screen panel according to claim 1, wherein each metal pattern is disposed diagonally with respect to the first direction.

8. The touch screen panel according to claim 1, wherein each metal pattern is made of a metallic material, and overlaps the second sensing cell with an insulating layer interposed between the second sensing cell and the metal pattern.

9. The touch screen panel according to claim 8, wherein said each metal pattern is formed of a low-resistance metallic material comprising one of molybdenum (Mo), silver (Ag), titanium (Ti), copper (Cu), aluminum (Al) and molybdenum/aluminum/molybdenum (Mo/Al/Mo).

10. The touch screen panel according to claim 1, wherein the adjacent first sensing cells are electrically connected to each other by providing the first connection pattern with the metal patterns at both edges of the transparent pattern with respect to the transparent pattern.

11. A display device having a touch screen panel, comprising:
a display panel which displays an image;
a first sensing pattern provided with a plurality of first sensing cells arranged on one row along a first direction on the display panel, and a first connection pattern through which adjacent first sensing cells are electrically connected to each other; and
a second sensing pattern provided with a plurality of second sensing cells arranged spaced-apart from the first sensing cells on one column along a second direction on the display panel, and a second connection pattern through which adjacent second sensing cells are electrically connected to each other,
the first connection pattern comprising at least two pairs of metal patterns arranged spaced-apart from one another, and a transparent pattern formed in a shape of an island in an interior of the second sensing pattern and electrically connected to an end of each of the metal patterns, the transparent pattern and the second sensing pattern configured to not overlap with each other in a direction perpendicular to a major surface of the transparent substrate.

12. The display device according to claim 11, wherein the transparent pattern is formed of a same material in a same layer as the second sensing pattern.

13. The display device according to claim 11, wherein the transparent pattern is formed of one of indium tin oxide (ITO) and indium zinc oxide (IZO).

14. The display device according to claim 11, wherein the transparent pattern is formed of a same material in a same layer as the first sensing pattern, and is spaced apart from the first sensing pattern.

15. The display device according to claim 11, wherein the transparent pattern is provided with a pair of transparent patterns arranged spaced-apart from each other in the adjacent second sensing cells, and wherein each of the pair of transparent patterns is disposed spaced-apart from a respective second sensing cell.

16. The display device according to claim 11, wherein the transparent pattern is extended from the second sensing cell to the second connection pattern and the adjacent second sensing cells.

17. The display device according to claim 11, wherein each metal pattern is disposed diagonally with respect to the first direction.

18. The display device according to claim 11, wherein each metal pattern is made of a metallic material, and overlaps the second sensing cell with an insulating layer interposed between the second sensing cell and the metal pattern.

19. The display device according to claim 18, wherein said each metal pattern is formed of a low-resistance metallic material comprising one of molybdenum (Mo), silver (Ag), titanium (Ti), copper (Cu), aluminum (Al) and molybdenum/aluminum/molybdenum (Mo/Al/Mo).

20. The display device according to claim 11, wherein the adjacent first sensing cells are electrically connected to each other by providing the first connection pattern with the metal patterns at both edges of the transparent pattern with respect to the transparent pattern.

* * * * *